United States Patent [19]
Haslett et al.

[11] Patent Number: 5,069,274
[45] Date of Patent: Dec. 3, 1991

[54] SPACECRAFT RADIATOR SYSTEM

[75] Inventors: Robert A. Haslett, Dix Hills; Robert L. Kosson, Massapequa; Martin Solon, Plainview, all of N.Y.

[73] Assignee: Grumman Aerospace Corporation, Bethpage, N.Y.

[21] Appl. No.: 454,822

[22] Filed: Dec. 22, 1989

[51] Int. Cl.⁵ ................. F28F 27/00; F28D 15/02
[52] U.S. Cl. ................................. 165/32; 165/41; 165/104.14; 165/104.26; 244/163
[58] Field of Search .............. 165/104.26, 41, 32, 165/104.14; 244/163

[56] References Cited

U.S. PATENT DOCUMENTS

| | | | |
|---|---|---|---|
| 4,351,388 | 9/1982 | Calhoun et al. | 165/104.26 |
| 4,440,215 | 4/1984 | Grover et al. | 165/104.26 |
| 4,470,451 | 9/1984 | Alario et al. | 165/104.26 |

FOREIGN PATENT DOCUMENTS 518614   7/1976   U.S.S.R. ............................ 165/32

Primary Examiner—Albert W. Davis, Jr.
Attorney, Agent, or Firm—Pollock, VandeSande & Priddy

[57] ABSTRACT

A heat pipe radiator system is rendered more survivable against laser attack while providing higher thermal performance with significantly lower weight. In order to achieve these advantages, the radiator fin is fabricated from carbon-carbon material which is quite resistant to laser destruction as well as exhibiting twice the thermal conductivity of ordinary metals, such as aluminum. An integral clamp secures the fin to each heat pipe, thereby thermally decoupling the fin from the heat pipe when layer heating occurs. A mesh heat pipe wick creates a vapor barrier in the interior of the heat pipes so that continuous operation of the heat pipe is ensured, even when the pipes are subjected to localized laser heating. The heat pipes are wrapped in multi-layer metal foil insulation to greatly reduce direct laser heating of the heat pipes.

7 Claims, 3 Drawing Sheets

SPACECRAFT RADIATOR SYSTEM

FIELD OF THE INVENTION

The present invention relates to radiator systems, and more particularly to a heat pipe system for use with a spacecraft power plant.

BACKGROUND OF THE INVENTION

Coolants employed in power generating systems aboard spacecraft normally circulate at elevated temperatures which require cooling by a radiator. This is typically done by employing heat pipe radiators which transfer the excessive heat to outer space. Conventional heat pipes usually employ a two-phase working fluid which absorbs coolant heat in an evaporator section where the working fluid becomes vaporized. The vaporized fluid flows over radiator fins which radiate heat to outer space and cause condensing of the working fluid which is then recirculated as liquid back to the evaporator section.

The radiator fins are normally mounted to the exterior of a spacecraft where they become vulnerable to laser weapons which can be trained on the radiator causing ordinary aluminum metal fins to melt. Less powerful laser impingement could prevent the condenser section of the radiator from condensing the vaporized working fluid therein so that the two-phase exchange of the working fluid cannot be completed. This would result in the inability of the radiator to achieve heat transfer between the coolant and the radiator. As an end result the coolant would remain at an overly high temperature thereby ultimately causing failure of the spacecraft power plant.

BRIEF DESCRIPTION OF THE INVENTION

The present invention is an improvement of a spacecraft heat pipe radiator system which accomplishes two primary objectives. The first objective is to incorporate fin materials and insulative materials which render the radiator less vulnerable to laser destruction. Second, the internal heat pipe construction is such as to permit phase change of a working fluid even when the radiator is subjected to laser impingement.

A byproduct of the present invention is a reduction of the weight necessary to achieve successful heat pipe operation accompanied by a superior operating performance of the improved system.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
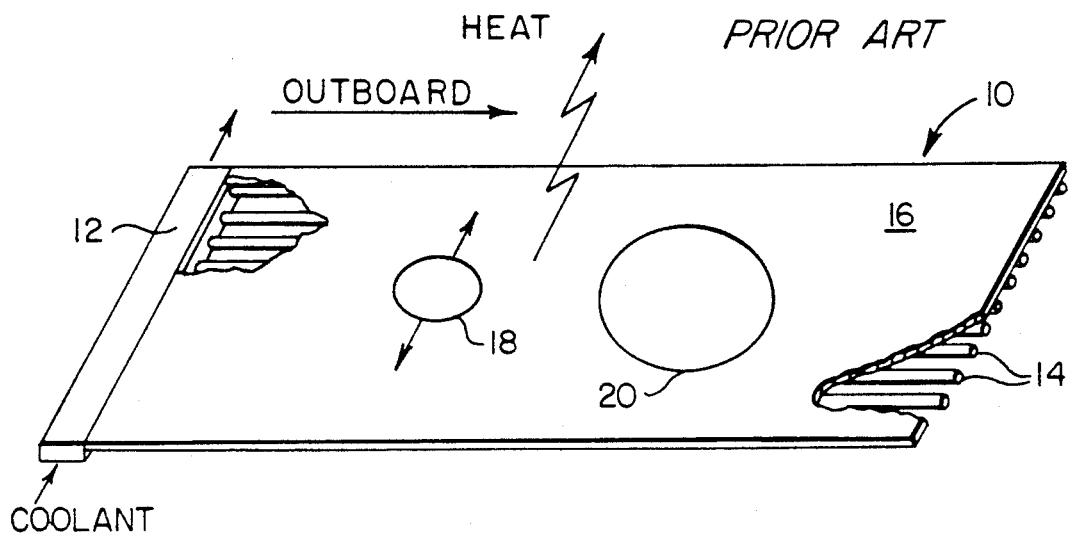
FIG. 1 is a perspective diagrammatic view of a generalized prior art spacecraft radiator.

In order to better understand the problems which the present invention solves, reference is made to FIG. 1 wherein a prior art heat pipe radiator 10 is illustrated. Coolant from a space vehicle power system, for example a multi-megawatt reactor, flows through the heat exchanger 12. The heat exchanger communicates with a plurality of heat pipes 14 which carry a working fluid therein. A large fin 16 is in thermal contact with the heat pipes and conducts heat from the heat pipes for subsequent radiation thereof to outer space. The fin 16 is vulnerable to laser destruction which could take the form of sweeping laser impingement by a small laser spot of high flux, as indicated by reference numeral 18. Alternately, the impingement may occur as a large spot of high flux generated by a fixed laser beam as indicated by reference numeral 20. As previously mentioned, conventional radiator systems can fail to cool the coolant as a result of such laser attack. This is due to the fact that there may be actual destruction of the fin material, typically made from aluminum. Obviously, the destruction of the fin would cause failure of the radiator, thereby preventing sufficient cooling of the coolant. Alternatively, sufficient heating of the heat pipes, as a result of laser impingement, prevents the working fluid contained therein from undergoing phase transformation. Thus, the coolant will not be cooled. By maintaining the coolant at elevated temperatures, the power system will ultimately fail.

Figure 2:
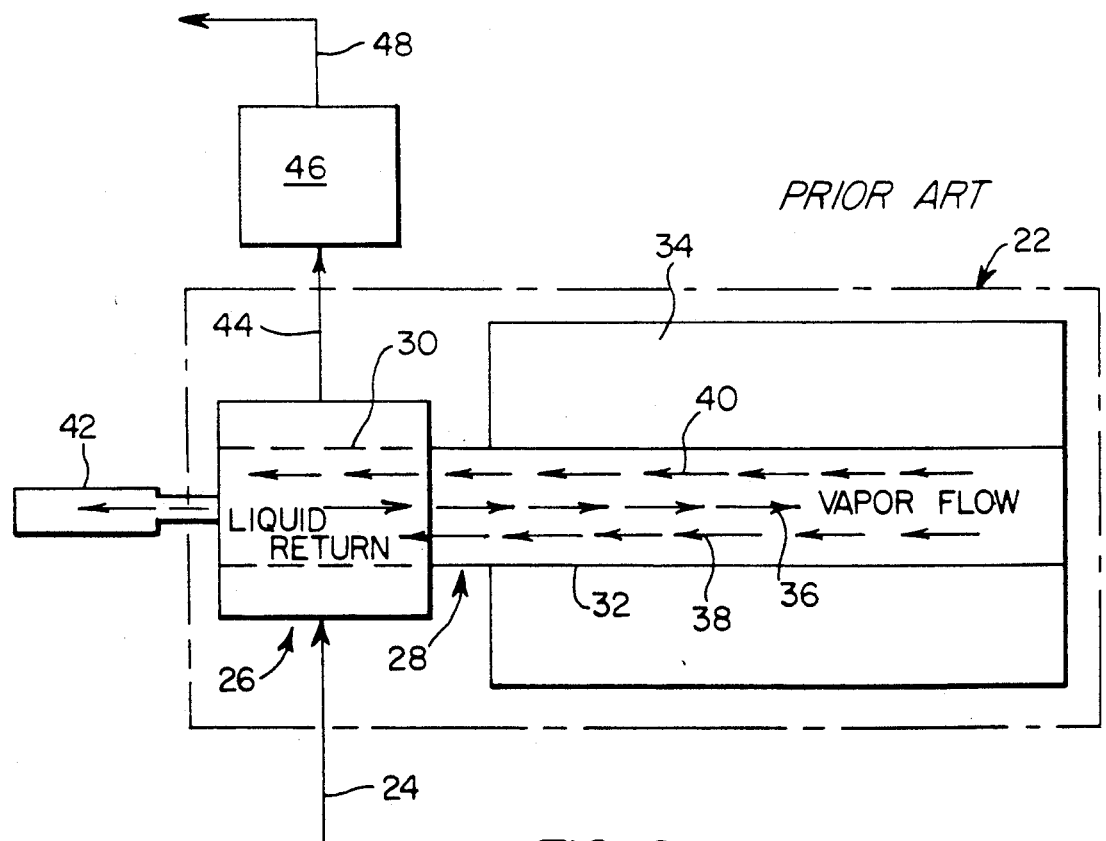
FIG. 2 is a schematic figure of a prior art radiator system.

FIG. 2 is a schematic illustration of a typical heat pipe radiator system 22. Power system coolant is seen introduced at 24 into heat exchanger 26. Heat pipe 28 is connected at a left end thereof to the heat exchanger 26. The left illustrated end section of the heat pipe 28 serves as an evaporator section 30 which communicates with an outward condenser section 32 of the heat pipe. A metal fin 34 is in thermal contact with the heat pipe condenser section 32 and radiates heat derived from the phase transformation of working fluid in the heat pipe condenser section 32. Although the simplified discussion of FIG. 2 involves a single heat pipe 28, it is to be recognized that a plurality of parallel disposed heat pipes is a preferred embodiment of construction.

FIG. 2 diagrammatically illustrates the flow of a two-phase working fluid within the conventional heat pipe 28. The working fluid is transformed to a vapor in the evaporator section 30. The vapor flows in direction 36 and has its heat conducted to the metal fin 34 along the condenser section 32. This causes the working fluid to transform to a second phase, namely, the liquid phase. The liquid is returned along direction 38 to the heat exchanger 26 by means of a conventional wick contained within the heat pipe (not shown).

A typical system such as is illustrated in FIG. 2 would operate in the reverse flow direction if subjected to laser heating and this is indicated by reference numeral 40. The reverse flow 40 would transport the laser thermal energy to the evaporator section which precludes the cooling of coolant 24.

A typical system of the type shown in FIG. 2 includes a liquid trap 42 to prevent the return flow of liquid between the heat exchanger 26 and the heat pipe 28, thereby stopping the reverse flow in the heat pipe.

In the typical system as shown in FIG. 2, the coolant flowing from heat exchanger 26 is often not sufficiently cooled to meet the requirements of an associated power system, especially when under laser attack. In such event, the coolant is introduced, at 44, to a thermal storage system 46 where the temperature of the coolant can be lowered. After this, the coolant may be returned to the power system via line 48.

Figure 3:
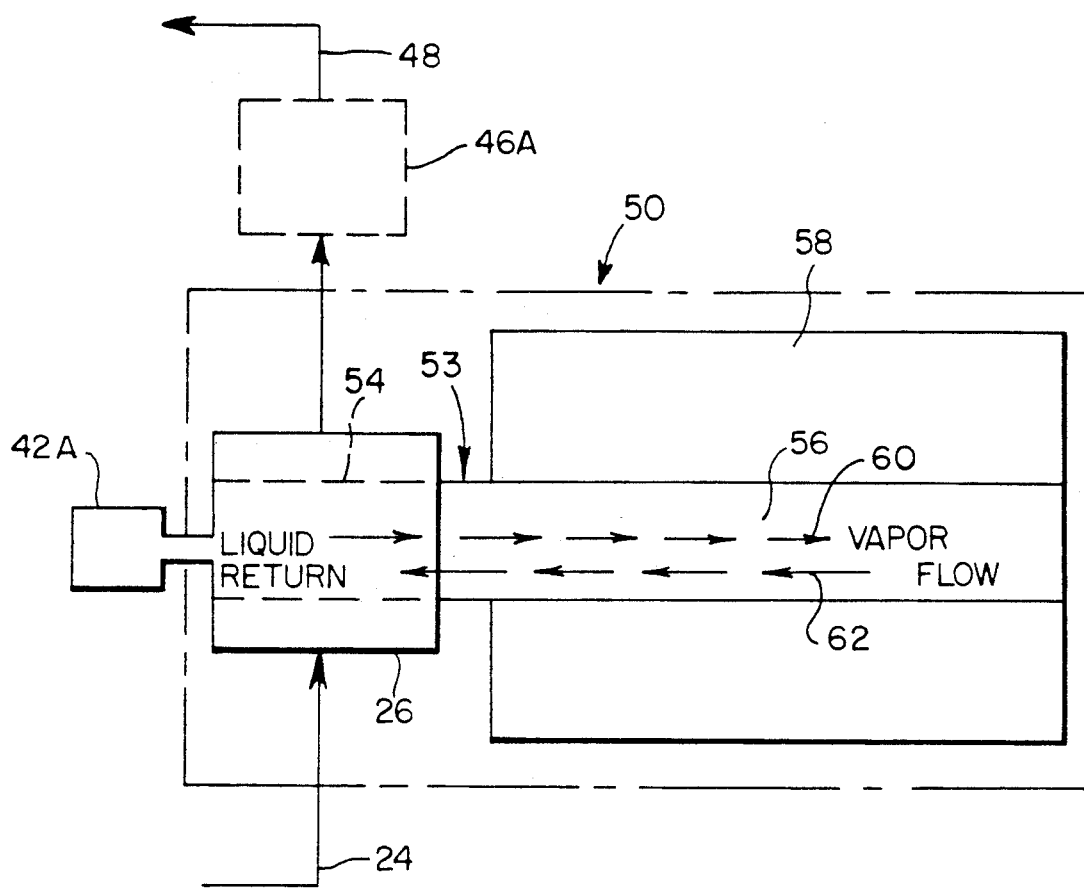
FIG. 3 is a schematic figure of the present invention.

FIG. 3 is a schematic illustration of the present high performance heat pipe radiator system. The system is generally indicated by reference numeral 50 and is seen to include the heat exchanger 26 of the prior art. In its conceptual form, a heat pipe 53 has its evaporator section 54 extend from the heat exchanger to a condenser section 56. A large fin 58 is secured in thermal contact to the condenser section 56. In marked contrast to a metal fin used in the prior art, the present invention employs carbon-carbon material which is far more resistant to laser destruction than the metal fin of the prior art. By virtue of the construction of the heat pipe, to be explained hereinafter, working fluid within the heat pipe will simply undergo two-phase transformation from vapor (60) to liquid (62). The present invention will avoid the occurrence of reverse flow which would be present in the prior art under similar adverse operating conditions.

The construction and operation of the present invention also allow greater inherent control of working fluid flow so that a liquid trap 42A may be substantially smaller than the trap 42 employed by the prior art. Further, the superior performance of the present invention permits a thermal storage system 46A to either be eliminated or reduced in size as compared with that of the prior art.

Figure 4:
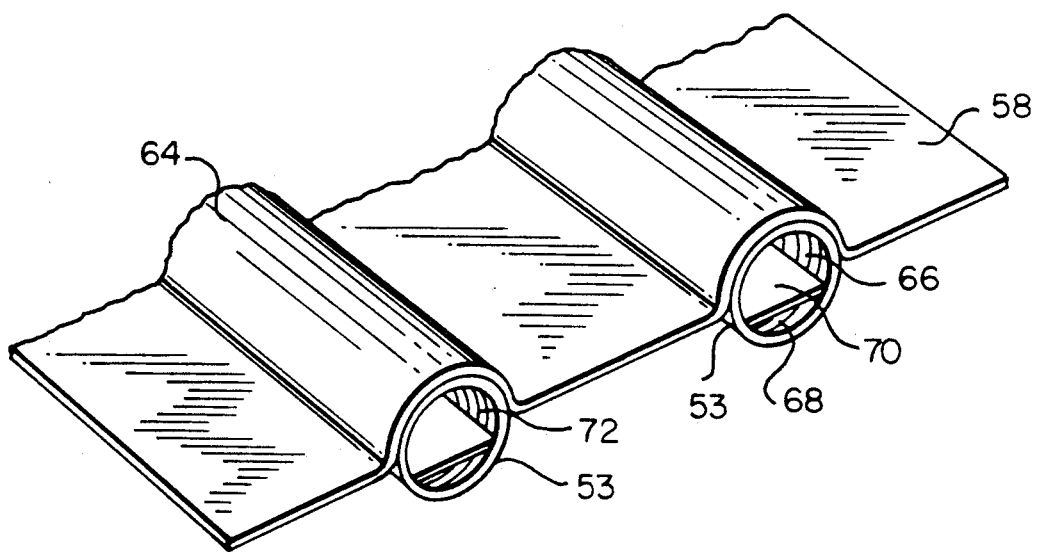
FIG. 4 is a partial cutaway view of a simplified heat pipe construction of the present invention.

FIG. 4 illustrates some of the structural features in a simplified form of the present invention. In this figure, two parallel heat pipes 53, normally closed at their ends, are illustrated. The cylindrical walls of the heat pipes engage semicylindrical deformations 64 formed in the fin 58 so that there is thermal contact between the heat pipes and the fin. The interior space of each heat pipe 53 is divided into two channels by means of a rectangular baffle plate 70. The upper illustrated channel is a vapor channel 66 while the lower channel is a liquid channel 68. Circumferential grooves 72 are formed along the length of each heat pipe.

The circular internal cross section of each heat pipe permits minimal wall thickness for pressure containment and wide choice of materials available as tubing. The single liquid and vapor passages in each heat pipe present minimum viscous flow pressure loss coupled with high capillary rise capability for high hydrodynamic transport capacity. The grooves 72 offer high condenser and evaporator film coefficients with attendant low temperature drop.

The vaporizable working fluid may be ammonia, methyl alcohol, or high-temperature, organic phase-change material.

Figure 5:
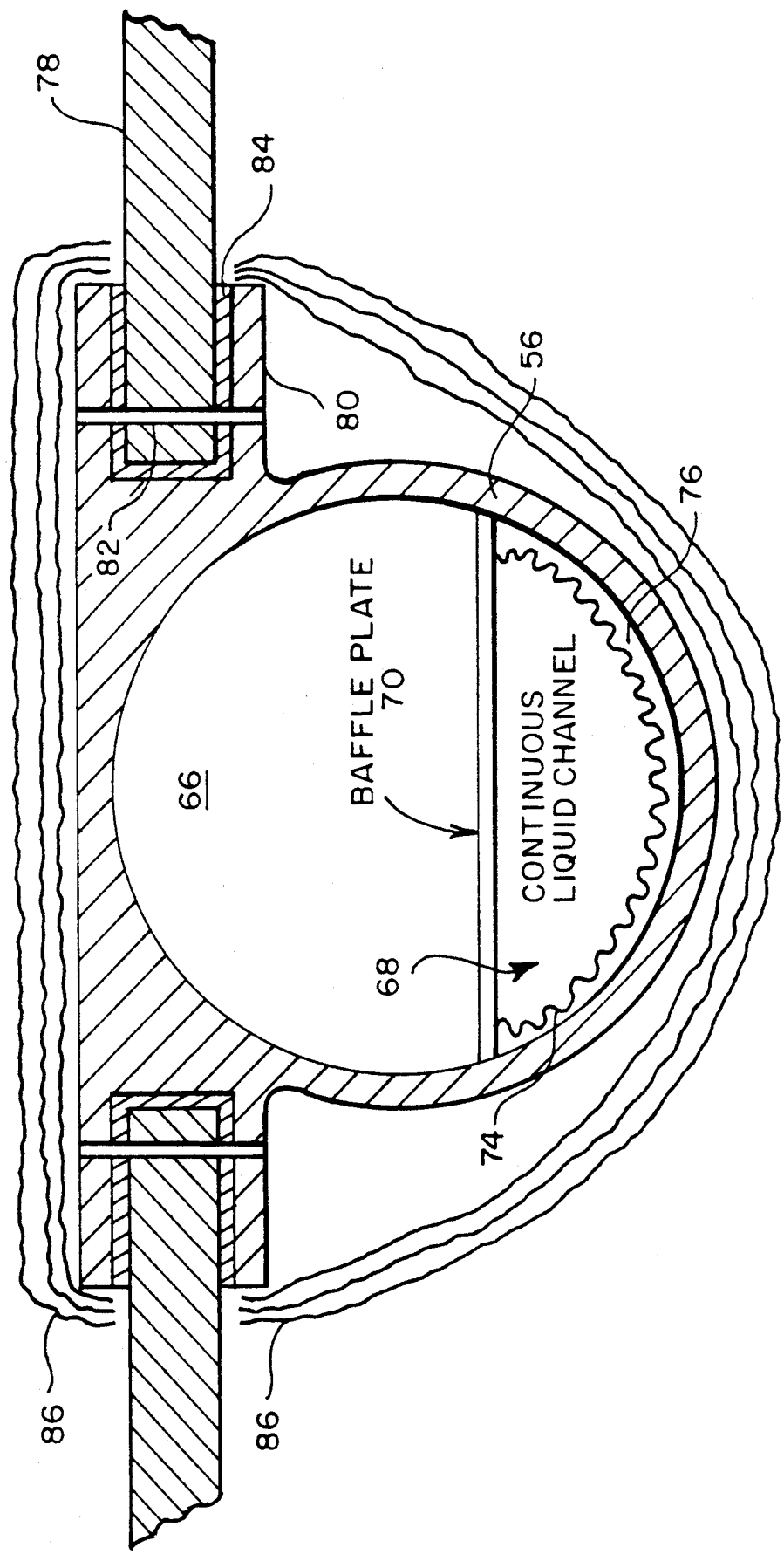
FIG. 5 is a cross-sectional view of an elaborated embodiment of the present invention.

FIG. 5 shows the construction of the present heat pipe in a more elaborate embodiment.

The lower liquid channel 68 is seen to enclose a mesh metallic strip 74 which serves to separate liquid returning from the condenser section of the heat pipe to the evaporator section from the heat pipe wall 56. The mesh strip has a cross-sectional curvature closely following that of the cylindrical heat pipe interior. However, there is a stand-off distance between the strip and the interior wall of the heat pipe to form an a partial annulus 76 which forms a self-insulating vapor partial annulus in response to laser heating. This prevents depriming of the heat pipe, which would otherwise occur when liquid in annulus 76 boils. The result will be continuous operation of the heat pipe, notwithstanding laser attack on localized areas such as 18 and 20 shown in FIG. 1. Because of the mesh strip, there is required little or no heat pipe liquid trap volume (42A in FIG. 3) since only a small amount of liquid is displaced (the annulus volume) due to laser heating. Further, an additional distinct advantage of the present wick location is that it can result in a large reduction in the thermal storage system required (46A in FIG. 3) since the only heat rejection area lost is that illuminated by the impinging laser spot, the remainder of the heat pipe working normally.

The present invention includes a novel means for mounting the carbon-carbon fin 78 which permits thermal decoupling of the fin to protect the heat pipes from laser heating. In order to achieve this end, the heat pipe body includes an elongated pair of parallel flanges forming a thermal clamp 80. An edge of fin 78 is positioned within the clamp and a retention pin 82 passes through the clamp and the received fin edge. Between the clamp and the fin is inserted a pair of foil strips 84, preferably of indium. The foil serves as an intersticial material promoting high thermal conductivity under clamping pressure.

The carbon-carbon fin material has been especially chosen because the carbon fibers in the material matrix are capable of withstanding intensive laser energy. The fibers have a high directional conductivity along the fibers so that by orienting the fin fibers normal to the pipe axis, impinging laser heat can be more efficiently removed from the heat pipes.

The thermal clamp 80 has a metallic material with a larger coefficient of expansion than that of the carbon-carbon material in the direction normal to the radiating surface. Thus, when the fin is subjected to laser heating, the clamp flanges expand and contact pressure between the clamp 80 and the fin is reduced. This, in effect, thermally decouples the fin from the heat pipe when the former is subjected to intense laser heat.

To further insulate the heat pipes from laser heat, the body of the heat pipe is wrapped with multi-layer metallic foil insulation.

The carbon-carbon fin material is preferably neutron hardened for nuclear radiation survivability. The material itself is far superior to aluminum since it has twice the thermal conductivity of the metal, an order of magnitude higher conductivity than other high temperature metals. This results in a much lighter system.

In certain installations of the present invention it may be necessary to absorb non-condensable gases. As in the case of conventional heat pipe radiator systems "getters" may be installed in connection with liquid trap 42A.

Thus, with the construction of the present invention, a heat pipe radiator system exhibits high survivability against laser attack yet provides higher thermal performance with significantly lower weight than present technology.

It should be understood that the invention is not limited to the exact details of construction shown and described herein for obvious modifications will occur to persons skilled in the art.

We claim:

1. A heat pipe radiator comprising:
   a plurality of parallel positioned pipes, each having evaporator and condenser sections therealong;
   circumferential fine grooves formed along an interior wall of the pipes for creating high film coefficients therebetween for preventing low temperature drops along the evaporator and condenser sections;

a planar baffle located within each pipe for creating separate liquid and vapor channels thus minimizing viscous pressure loss coupled with high capillary rise capability for high hydrodynamic transport capacity;

each pipe having two opposing pairs of elongated spaced flanges extending laterally outward; and a plurality of fin sections having their respective edges clamped between adjacent pairs of flanges, the material of the fin sections having a lower coefficient of thermal expansion in a direction normal to the fin surface than that of the pipes thereby causing release of clamping pressure therebetween and minimizing heat flow from the fin to the pipe in the event the fin is exposed to a high energy source.

2. The structure set forth in claim 1 wherein the fin material is carbon-carbon and wherein carbon fibers thereof are directed perpendicular to the pipes for optimizing heat flow from the pipes to the fin sections.

3. The structure set forth in claim 1 together with a fine mesh member located along the interior length of each pipe to serve as a barrier between the liquid and the heat pipe wall on the return path of liquid from the condenser to evaporator sections.

4. The structure set forth in claim 1 together with a sleeve of metal foil insulation material wrapped around each pipe for reducing the heating effect of a high energy source directed toward the pipe.

5. A heat pipe radiator comprising:

a plurality of parallel positioned pipes, each having evaporator and condenser sections therealong;

circumferential fine grooves formed along an interior wall of the pipes for creating high film coefficients therebetween for preventing low temperature drops along the evaporator and condenser sections;

a planar baffle located within each pipe for creating separate liquid and vapor channels thus minimizing viscous pressure loss coupled with high capillary rise capability for high hydrodynamic transport capacity;

each pipe having two opposing pairs of elongated spaced flanges extending laterally outward; and a plurality of carbon-carbon fin sections having their respective edges clamped between adjacent pairs of flanges, the material of the fin sections having a lower coefficient of thermal expansion than that of the pipes thereby causing release of clamping pressure therebetween and minimizing heat flow from the fin to the pipe in the event the fin is exposed to a high energy source;

fibers in the carbon-carbon material being directed perpendicular to the pipes for optimizing heat flow from the pipes to the fin sections; and a curved fine mesh member located along the interior length of each pipe to serve as a barrier between the liquid and the heat pipe wall on the return path of liquid from the condenser to evaporator sections.

6. The structure set forth in claim 5 together with fastener means for retaining the fin sections between respective flanges.

7. The structure set forth in claim 5 together with a sleeve of metal foil insulation material wrapped around each pipe for reducing the heating effect of a high energy source directed toward the pipe.

* * * * *

UNITED STATES PATENT AND TRADEMARK OFFICE
CERTIFICATE OF CORRECTION

PATENT NO. : 5,069,274

DATED : December 3, 1991

INVENTOR(S) : Robert A. Haslett, et al.

It is certified that error appears in the above-identified patent and that said Letters Patent is hereby corrected as shown below:

In the Abstract, line 10, change "layer" to --laser--.

Column 3, line 62, delete "an".

Signed and Sealed this

Thirtieth Day of March, 1993

Attest:

STEPHEN G. KUNIN

Attesting Officer

Acting Commissioner of Patents and Trademarks